(12) United States Patent
Roehr et al.

(10) Patent No.: US 8,448,914 B2
(45) Date of Patent: May 28, 2013

(54) SENSOR ARRANGEMENT FOR A VEHICLE WINDOW

(75) Inventors: Michael Roehr, Dortmund (DE); Frank Hagen, Luedenscheid (DE)

(73) Assignee: Leopold Kostal GmbH & Co. KG, Luedenscheid (DE)

( * ) Notice: Subject to any disclaimer, the term of this patent is extended or adjusted under 35 U.S.C. 154(b) by 204 days.

(21) Appl. No.: 13/033,680

(22) Filed: Feb. 24, 2011

(65) Prior Publication Data

US 2011/0155874 A1 Jun. 30, 2011

Related U.S. Application Data

(63) Continuation-in-part of application No. PCT/EP2009/061078, filed on Aug. 27, 2009.

(30) Foreign Application Priority Data

Aug. 28, 2008 (DE) .......................... 10 2008 044 840

(51) Int. Cl.
*F16M 11/00* (2006.01)
(52) U.S. Cl.
USPC ........................... 248/689; 248/681; 73/866.5
(58) Field of Classification Search
USPC ............ 248/689, 691, 613, 681, 208, 220.22, 248/510; 73/170.17, 866.5
See application file for complete search history.

(56) References Cited

U.S. PATENT DOCUMENTS

| | | | | |
|---|---|---|---|---|
| 3,900,795 A * | 8/1975 | Larsen et al. | ................. | 324/537 |
| 6,299,319 B1 * | 10/2001 | Mertens et al. | ............... | 359/871 |
| 6,581,484 B1 * | 6/2003 | Schuler | ........................ | 73/866.5 |
| 6,894,619 B1 * | 5/2005 | Schmitt et al. | ................ | 340/604 |
| 7,558,067 B2 * | 7/2009 | Lin | ................ | 361/710 |
| 7,911,356 B2 * | 3/2011 | Wohlfahrt et al. | ......... | 340/693.9 |
| 8,051,707 B2 * | 11/2011 | Roehr et al. | ............... | 73/170.17 |
| 8,192,095 B2 * | 6/2012 | Kortan et al. | ................ | 396/419 |
| 2004/0032720 A1 * | 2/2004 | McHugh et al. | .............. | 361/719 |
| 2007/0205348 A1 * | 9/2007 | Schmitt et al. | ............... | 248/503 |
| 2008/0092673 A1 * | 4/2008 | Hansel et al. | ................ | 73/866.5 |

OTHER PUBLICATIONS

International Bureau, International Preliminary Report on Patentability for corresponding PCT application PCT/EP2009/061078 mailed Mar. 10, 2011.

* cited by examiner

*Primary Examiner* — Bradley Duckworth
(74) *Attorney, Agent, or Firm* — Brooks Kushman P.C.

(57) ABSTRACT

A sensor arrangement for a vehicle window includes a mounting frame having an engagement portion, a sensor housing attachable to the mounting frame, a spring-loaded bracket connected to the sensor housing, and a two-arm lever. The lever is pivotably mounted to the bracket, wherein pivoting of the lever causes the bracket to compress and press the sensor housing against the mounting frame. The second lever arm engages the engagement portion of the mounting frame after the lever is further pivoted to a final assembly position to thereby hold the sensor housing in place against the mounting frame.

18 Claims, 4 Drawing Sheets

SENSOR ARRANGEMENT FOR A VEHICLE WINDOW

CROSS-REFERENCE TO RELATED APPLICATIONS

This application is a continuation-in-part of International Application No. PCT/EP2009/061078, published in German, with an international filing date of Aug. 27, 2009, which claims priority to DE 10 2008 044 840.0, filed Aug. 28, 2008; the disclosures of which are incorporated by reference.

TECHNICAL FIELD

The present invention relates to a sensor arrangement having a mounting frame attachable to a vehicle window, a sensor housing attachable to the mounting frame, and a spring-loaded lever mounted in a pivotable manner on the sensor housing, in which an end section of the lever engages the mounting frame when the lever is pivoted about the sensor housing whereby the lever presses the sensor housing through spring action against the window.

BACKGROUND

EP 1 202 885 B1 (corresponding to U.S. Pat. No. 6,894,619) describes a sensor arrangement having a mounting frame attachable to a vehicle window, a sensor housing attachable to the mounting frame, and a pair of lever-type clamps. Each clamp is a stamped metal part having a bent end section, an elastic middle section, and a retaining bracket end section. The bent end sections are movably inserted into respective pocket-shaped formations of the housing to pivotably connect the clamps to the housing. The retaining bracket end sections can be pressed against the spring tension of the elastic regions by respective pins on the mounting frame. The housing is thereby pressed against the window by spring pressure. The clamps respectively form a single arm lever by the linkages to the housing. Since the attachment of the clamps to the mounting frame results from the application of force by a corresponding section of the single arm lever, the assembly force that must be applied is relatively large.

A disadvantage is that the assembly force acts directly on the relatively complex molded clamps, which are relatively difficult to handle. Another disadvantage is that two clamps that must be separately assembled are required using this arrangement to achieve a uniform pressure of the housing against the window. Another disadvantage is that yoke springs, such as those used in the elastic middle sections of the clamps, have relatively stiff spring constants. This means that component tolerances that depend on the distances between components of the housing and the mounting frame have a significant influence on the spring force, so that the pressure of the housing against the window is difficult to adjust properly.

SUMMARY

An object of the present includes a sensor arrangement which is relatively simple and cost-effective, can be mounted on the vehicle window with relatively little expenditure of effort, and has components that can be easily manipulated during installation on the window.

In carrying out the above object and other objects, the present invention provides a sensor arrangement. The sensor arrangement includes a mounting frame having an engagement portion, a sensor housing attachable to the mounting frame, a spring-loaded bracket connected to the sensor housing, and a lever. The lever is a two-arm lever having first and second lever arms. The lever is pivotably mounted to the bracket. Pivoting of the lever causes the bracket to compress and press the sensor housing against the mounting frame. The second lever arm engages the engagement portion of the mounting frame after the lever is further pivoted to a final assembly position to thereby hold the sensor housing in place against the mounting frame.

Further, in carrying out the above object and other objects, the present invention provides a sensor arrangement for a vehicle window. The sensor arrangement includes a mounting frame attachable to a window, a sensor housing attachable to the mounting frame, a spring-loaded bracket connected to the sensor housing, and a lever. The mounting frame has an engagement portion. The lever is a two-arm lever having first and second lever arms. The lever is pivotably mounted to the bracket. Pivoting of the lever causes the bracket to compress and press the sensor housing against the window when both the mounting frame is attached to the window and the sensor housing is attached to the mounting frame. The second lever arm engages the engagement portion of the mounting frame after the lever is further pivoted to a final assembly position to thereby hold the sensor housing in place against the window.

Also, in carrying out the above object and other objects, the present invention provides a sensor arrangement. This sensor arrangement includes a mounting frame having an engagement portion, a sensor housing, and a lever. The lever is a two-arm lever having first and second lever arms. The lever is pivotably mounted to the sensor housing. Pivoting of the lever causes the sensor housing to move toward the mounting frame. The second lever arm engages the engagement portion of the mounting frame after the lever is further pivoted to a final assembly position to thereby hold the sensor housing in place against the mounting frame.

In accordance with embodiments of the present invention, a sensor arrangement for a vehicle includes a support frame that can be fastened to a vehicle window pane, a sensor housing that can be attached to the support frame, and a spring-mounted lever mounted at the sensor housing, wherein after the lever is tilted a lever section reaches behind indentations at the support frame, resulting in the lever pressing the sensor housing against the window pane in spring-loaded fashion, wherein the lever forms a dual-armed lever.

In accordance with embodiments of the present invention, the lever is a two-arm lever. The "two arm" concept is used here in the physical sense and thereby designates a lever whose pivot point is situated between a force arm and a load arm. The use of a two-arm lever for connecting the sensor housing and the mounting frame enables force multiplication to be achieved by a lengthened path of motion. The assembly force required is thereby comparatively small, despite a higher attainable pressure force of the sensor housing against the vehicle window.

The manageability of the lever can be improved by suitably designing the second lever arm provided for actuation so that the assembly process becomes more comfortable. In this respect, in embodiments of the present invention, the actuating surface formed on a lever arm of the lever does not grip the mounting frame. By the actuating surface, the lever can be actuated by pressure during assembly by using the entire handle surface, which simplifies the assembly process.

In embodiments of the present invention, the lever forms two lever surfaces parallel to one another from a single piece and the two lever surfaces are connected to one another by the actuating surface.

In embodiments of the present invention, an elastic bracket is connected to the sensor housing and the lever is mounted on the bracket. The spring effect can essentially arise by mounting the lever on the elastic bracket so that the lever itself can be formed as an essentially rigid component that is especially stable.

In embodiments of the present invention, the bracket binds together various housing components of a sensor housing having multiple parts and is latched to at least one housing component of the sensor housing. Such an arrangement is described in WO 2009/1523254.

In embodiments of the present invention, the lever is mounted on a knife edge bearing formed on the bracket. Such a knife edge bearing operates with low friction by tipping of a strip of sheet metal in the peak of an opening made as a triangular shape or as a sector of a circle.

In embodiments of the present invention, the lever or the lever surfaces have at least one molded latch eye that is snapped together with a pin(s) molded on the mounting frame in the final assembled position of the sensor arrangement.

The above features, and other features and advantages of the present invention are readily apparent from the following detailed descriptions thereof when taken in connection with the accompanying drawings.

DETAILED DESCRIPTION

As required, detailed embodiments of the present invention are disclosed herein; however, it is to be understood that the disclosed embodiments are merely exemplary of the present invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
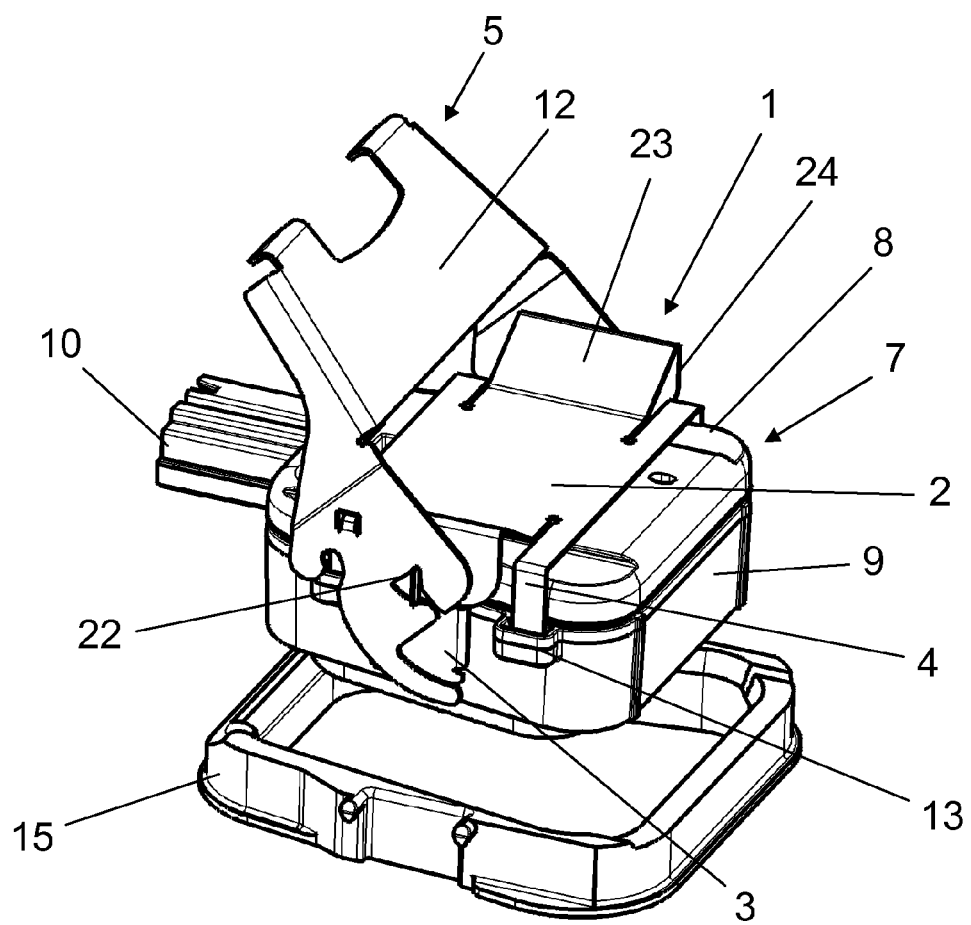
FIG. 1 illustrates a perspective view of a sensor arrangement having a mounting frame attachable to a vehicle window, a sensor housing attachable to the mounting frame, and a spring-loaded lever pivotably mounted on the sensor housing during an initial assembly phase of the sensor arrangement in accordance with an embodiment of the present invention.

Referring now to FIG. 1, a perspective view of a sensor arrangement in accordance with an embodiment of the present invention is shown. The sensor arrangement includes a mounting frame 15, a sensor housing 7, and a spring-loaded lever 5. Mounting frame 15 can be mounted to a vehicle window such as a windshield (not shown). Mounting frame 15 is mountable to the vehicle window by an adhesive or the like. Sensor housing 7 is attachable (e.g., can be clamped) to mounting frame 15. Lever 5 is mountable in a pivotable manner on sensor housing 7.

FIG. 1 illustrates an initial assembly phase of the sensor arrangement in which sensor housing 7 is unattached from mounting frame 15 and in which lever 5 has not been pivoted about sensor housing 7. In the final assembly phase of the sensor arrangement (shown in FIG. 6), mounting frame 15 is mounted to a vehicle window such as a windshield, sensor housing 7 is attached to mounting frame 15, and lever 5 is pivoted about sensor housing 7 and presses sensor housing 7 through spring action against the window.

Sensor housing 7 houses electronic and optical components. Such components may include a light conductor for coupling electromagnetic radiation through an optical coupler into and out of the vehicle window, a circuit board for mounting electronic sensor components and connecting them electrically with one another, etc. Sensor housing 7 preferentially houses at least one optical sensor such as a camera.

Sensor housing 7 is formed by two parts: a sensor housing body 9; and a sensor housing cover 8. Sensor housing cover 8 attaches to sensor housing body 9 to cover sensor housing body 9 and thereby form the assembled sensor housing 7. A connector piece 10 containing plug-in contacts is formed on sensor housing cover 8. Electronic sensor components inside sensor housing 7 can be connected electrically to external electronics via connector piece 10.

The sensor arrangement further includes a bracket 1. Bracket 1 is formed from a sheet metal strip and has an essentially flat base surface 2 in a middle region thereof. Bracket 1 further includes a plurality of spring arms 4 which extend perpendicularly away from respective corners of base 2. Bracket 1 further includes first and second bracket side portions 3. Bracket side portions 3 are integrally formed on the opposite narrow sides of bracket base 2 between a corresponding pair of spring arms 4. Each bracket side portion 3 includes a first section 23 and a second section 24. First section 23 is bent upwards at a sloping angle from bracket base 2. Second section 24 is bent downwards from first section 23 in the opposite direction such that second section 24 extends approximately perpendicular to bracket base 2.

Bracket 1 mechanically connects sensor housing cover 8 to sensor housing body 9 in order to form the assembled sensor housing 7. To this end, sensor housing cover 8 is placed over sensor housing body 9 and bracket 1 is positioned over sensor housing cover 8 such that bracket base 2 meets sensor housing cover 8 and such that spring arms 4 extend towards sensor housing body 9. Spring hooks (not shown) integrally formed on spring arms 4 engage in latching receptacles 13 on sensor housing body 9 to thereby mechanically connect bracket 1 to sensor housing body 9 with sensor housing cover 8 sandwiched therebetween. Latching receptacles 13 are integrally molded on sensor housing body 9. The receptacle openings of latching receptacles 13 are oriented parallel to the main surface of sensor housing body 9.

The spring hooks formed on spring arms 4 thereby produce a rigid connection that can only be released by a deliberate manipulation between bracket 1 and sensor housing body 9. Sensor housing cover 8 located between bracket 1 and sensor housing body 9 is pressed by bracket base 2 against sensor housing body 9 such that both parts of sensor housing 7 are connected to one another by bracket 1 and bracket 1 is concurrently attached to sensor housing 7.

As indicated above, the sensor arrangement includes lever 5 which is mountable in a pivotable manner on sensor housing 7. As described in greater detail below, lever 5 is pivotably mounted on bracket 1 by a knife edge bearing 22 with bracket 1 being connected to sensor housing 7 in the manner described above.

Figure 2:
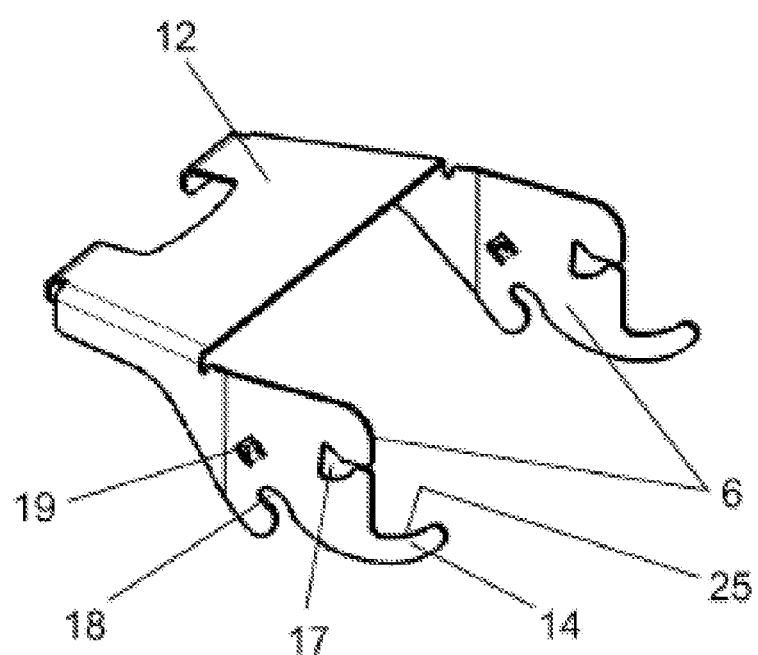
FIG. 2 illustrates a perspective view of the lever.

Referring now to FIG. 2, with continual reference to FIG. 1, a perspective view of lever 5 is shown. Lever 5 is an integrally formed sheet metal stamped part having a main actuating surface 12 and first and second lever surfaces 6. Lever surfaces 6 respectively extend from opposite sides of actuating surface 12. Lever surfaces 6 are oriented parallel to one another and are connected to one another through actuating surface 12 which is oriented perpendicularly to them. Each lever surface 6 has an inwardly bent latching tongue 19, a latching eye 18, an opening 17, and an arc-shaped formed part 14 as an end section. The inner side of end section 14 forms a latching curve 25.

Figure 3:
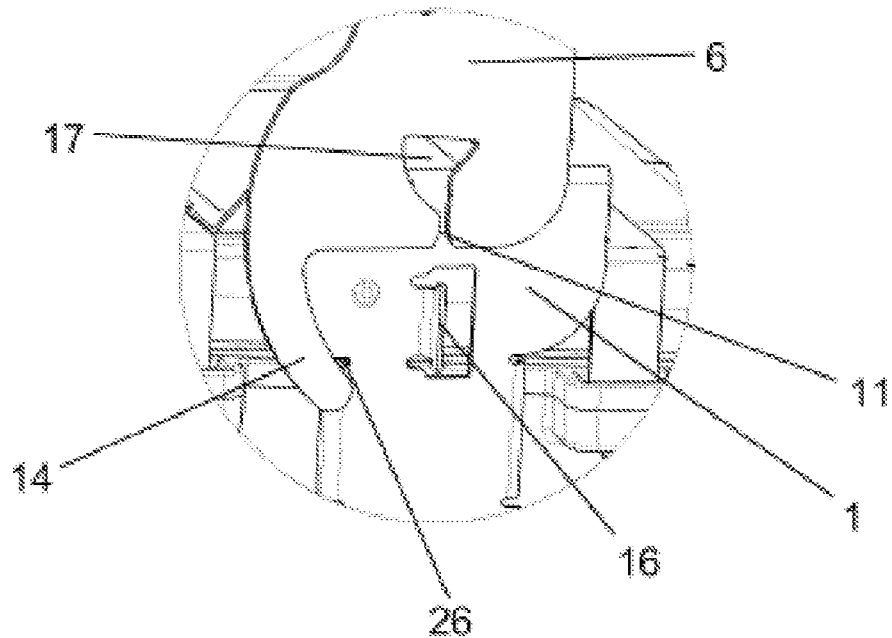
FIG. 3 illustrates a sectional view of a lever surface of the lever with the lever surface being detached from a bracket attached to the sensor housing.

Referring now to FIG. 3, with continual reference to FIGS. 1 and 2, a sectional view of a lever surface 6 of lever 5 with lever surface 6 being detached from bracket 1 is shown. Opening 17 in lever surface 6 is formed as a circular segment and has an incision 11 leading to the edge of lever surface 6. A bent sheet metal strip formed on bracket 1 can be inserted into incision 11, which cooperates with the edge surfaces of opening 17 and forms a knife edge 16 of a knife edge lever bearing. Knife edge bearing 22 can be particularly seen in FIG. 5.

Figure 4:
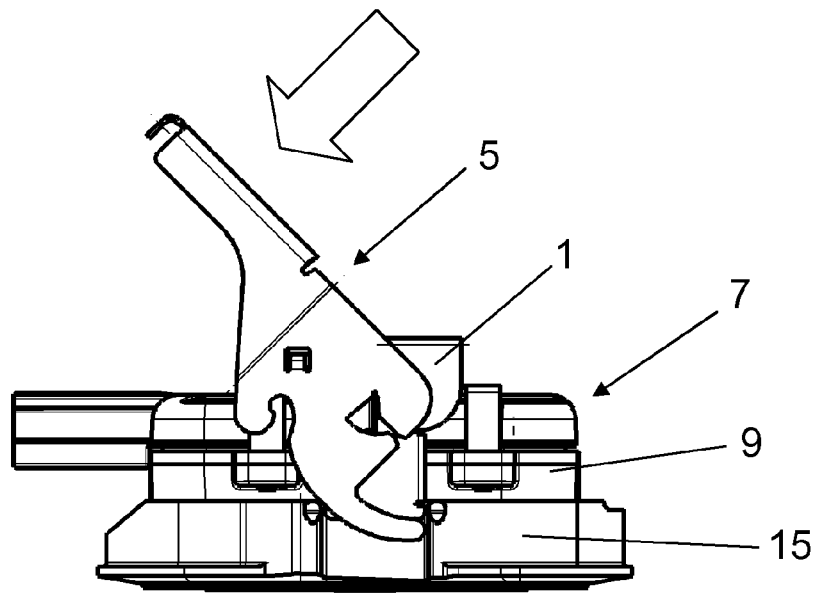
FIG. 4 illustrates a side view of the sensor arrangement during an intermediate assembly phase of the sensor arrangement prior to the lever being latched to the mounting frame.

Referring now to FIG. 4, with continual reference to FIGS. 1, 2, and 3, a side view of the sensor arrangement during an intermediate assembly phase of the sensor arrangement prior to lever 5 being latched to mounting frame 15 is shown. In the intermediate assembly phase, lever 5 is preassembled with bracket 1 and bracket 1 is already connected to sensor housing 7. This arrangement is also used in mounting frame 15 so that mounting frame 15 circumferentially encloses sensor housing body 9.

Lever 5 forms a two-arm lever by being mounted on bracket 1. The section of lever 5 striking mounting frame 15 forms a distinctly shorter lever arm than the section of lever 5 belonging to actuating surface 12. The torque acting on the longer lever arm with actuating surface 12 pivots lever 5 automatically into the final assembled position due to its own weight.

Figure 5:
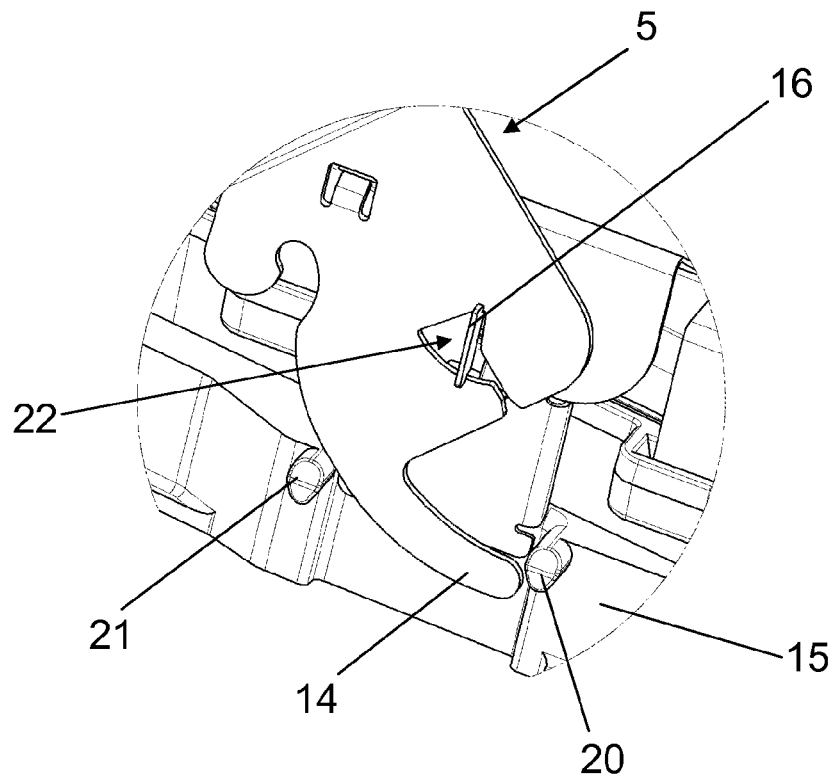
FIG. 5 shows a sectional view of the lever surface of the lever with the lever surface being pivotably connected to the bracket during the intermediate assembly phase of the sensor arrangement.

Referring now to FIG. 5, with continual reference to FIG. 4, a sectional view of lever surface 6 of lever 5 with lever surface 6 being pivotably connected to bracket 1 during the intermediate assembly phase of the sensor arrangement is shown. In the intermediate assembly phase of the sensor arrangement, sensor housing 7 is introduced into mounting frame 15 and lever 5 is pivoted downwards in the direction shown by the arrow in FIG. 4. The arc-shaped formed part 14 of lever section 6 reaches under a first pin 20 of mounting frame 15 and is guided by first pin 20 along latching curve 25 on formed part 14 of lever surface 6. At the end of the pivoting motion, latching eye 18 of lever surface 6 latches to a second pin 21 of mounting frame 15. When this latching takes place the assembly of the sensor arrangement is concluded (i.e., the final assembly phase of the sensor arrangement is reached at this time).

Figure 6:
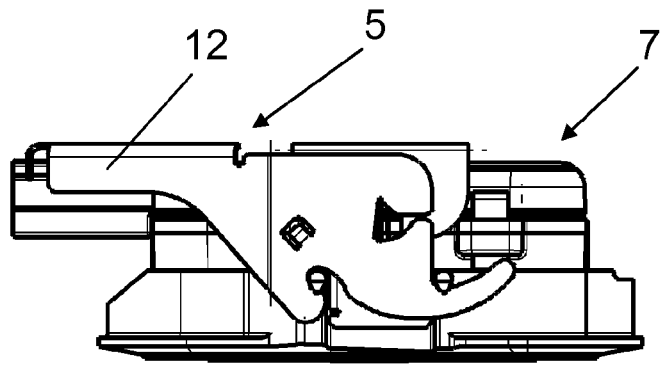
FIG. 6 illustrates a side view of the sensor arrangement during a final assembly phase of the sensor arrangement after the lever has been latched to the mounting frame.
Figure 7:
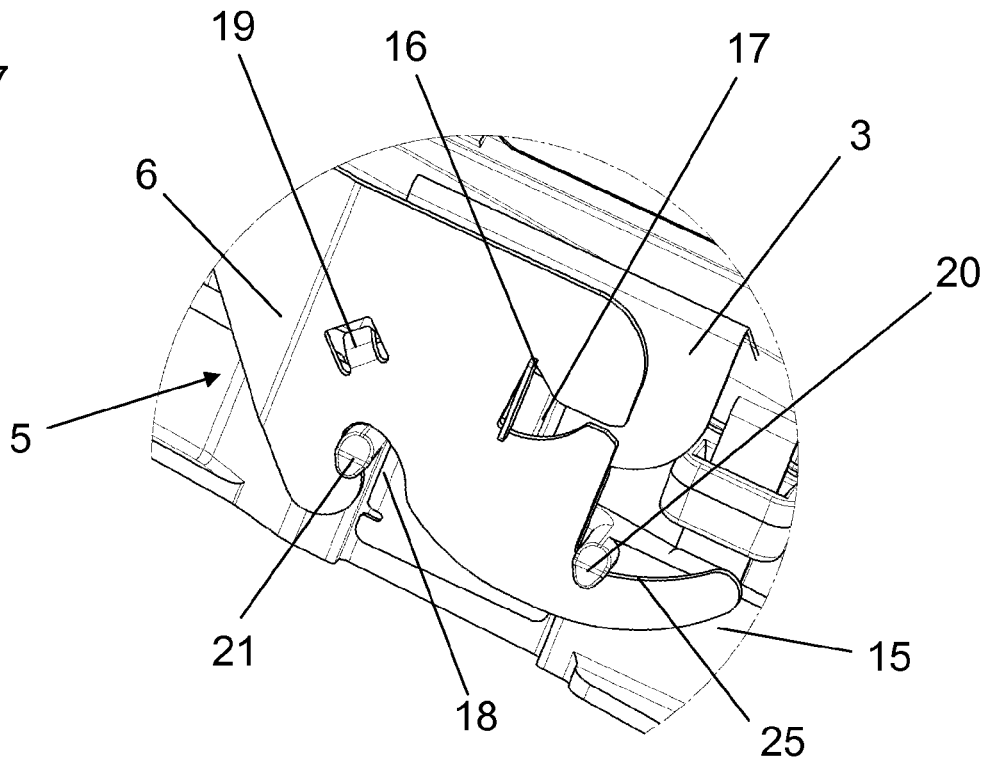
FIG. 7 illustrates a sectional view of the lever surface of the lever with the lever surface being pivotably connected to the bracket and being latched to the mounting frame during the final assembly phase of the sensor arrangement.

FIG. 6 illustrates a side view of the sensor arrangement during the final assembly phase of the sensor arrangement after lever 5 has been latched to mounting frame 15. FIG. 7 illustrates a sectional view of lever surface 6 of lever 5 with lever surface 6 being pivotably connected to bracket 1 and being latched to mounting frame 15 during the final assembly phase of the sensor arrangement.

In the final assembly phase of the sensor arrangement, actuating surface 12 of lever 5 lies on the upper side of sensor housing 7. Bracket 1 likewise lies tightly against sensor housing 7 such that the entire sensor arrangement now exhibits a relatively thin profile. As is shown in the detail view of FIG. 7, latching curves 25 and latching eyes 18 fit tightly with pins 20, 21 on mounting frame 15. The spring force of bracket side portion 3 presses knife edge 16 of the knife edge bearing against the acute angle portion of opening 17 in lever surface 6. However, since lever 5 is immovably fixed in the perpendicular direction on mounting frame 15, the spring force of bracket side portion 3 presses sensor housing 7 against the vehicle window (not shown).

The orientation of lever 5 in its final position is assured by latching tongue 19 formed on lever surface 6, which is latched with lug 26 formed on bracket 1 as seen in FIG. 3.

REFERENCE SYMBOLS 1 bracket
2 bracket base
3 bracket side portion
4 spring arm
5 lever
6 lever surface
7 sensor housing
8 sensor housing cover
9 sensor housing body
10 connector piece
11 incision
12 actuating surface
13 latching receptacles
14 arc-shaped formed part
15 mounting frame
16 knife edge
17 opening
18 latching eye
19 latching tongue
20 first pin
21 second pin
22 knife edge bearing
23 first section of the bracket side portion
24 second section of the bracket side portion
25 latching curve
26 lug While exemplary embodiments are described above, it is not intended that these embodiments describe all possible forms of the present invention. Rather, the words used in the specification are words of description rather than limitation, and it is understood that various changes may be made without departing from the spirit and scope of the invention. Additionally, the features of various implementing embodiments may be combined to form further embodiments of the present invention.

What is claimed is:

1. A sensor arrangement comprising:
a mounting frame having an engagement portion;
a sensor housing attachable to the mounting frame;
a spring-loaded bracket connected to the sensor housing; and
a two-arm lever having first and second lever arms, wherein the lever is pivotably mounted to the bracket at a pivot point between a portion of the first lever arm and a portion of the second lever arm, wherein the portions of the lever arms are aligned with the pivot point and with one another, wherein pivoting of the lever in response to torque acting on the first lever arm causes the bracket to compress and press the sensor housing against the mounting frame, wherein the second lever arm engages the engagement portion of the mounting frame after the lever is further pivoted to a final assembly position to thereby hold the sensor housing in place against the mounting frame.

2. The arrangement of claim 1 wherein:
the first lever arm of the lever includes an actuating surface, wherein the first lever arm never engages the engagement portion of the mounting frame.

3. The arrangement of claim 2 wherein:
the lever includes two lever surfaces mounted parallel to two side surfaces of the sensor housing, and the lever surfaces are connected to one another by the actuating surface.

4. The arrangement of claim 1 wherein:
the engagement portion includes one or more pins on the mounting frame.

5. The arrangement of claim 1 wherein:
the sensor housing includes a sensor housing body and a sensor housing cover;
wherein the bracket is on the sensor housing cover and is connected to the sensor housing body such that the sensor housing body and the sensor housing cover are mechanically connected to one another via the bracket with the sensor housing cover being sandwiched between the bracket and the sensor housing body.

6. The arrangement of claim 1 wherein:
the bracket includes a knife edge bearing;
wherein the lever is pivotably mounted to the bracket at the pivot point by being pivotably mounted on the knife edge bearing of the bracket.

7. The arrangement of claim 1 wherein:
the first lever arm is longer than the second lever arm.

8. A sensor arrangement for a vehicle window, the sensor arrangement comprising:
a mounting frame attachable to a window, the mounting frame having an engagement portion;
a sensor housing attachable to the mounting frame;
a spring-loaded bracket connected to the sensor housing; and
a two-arm lever having first and second lever arms, wherein the lever is pivotably mounted to the bracket at a pivot point between a portion of the first lever arm and a portion of the second lever arm, wherein the portions of the lever arms are aligned with the pivot point and with one another, wherein pivoting of the lever in response to torque acting on the first lever arm causes the bracket to compress and press the sensor housing against the window when both the mounting frame is attached to the window and the sensor housing is attached to the mounting frame, wherein the second lever arm engages the engagement portion of the mounting frame after the lever is further pivoted to a final assembly position to thereby hold the sensor housing in place against the window.

9. The arrangement of claim 8 wherein:
the first lever arm of the lever includes an actuating surface, wherein the first lever arm never engages the engagement portion of the mounting frame.

10. The arrangement of claim 9 wherein:
the lever includes two lever surfaces mounted parallel to two side surfaces of the sensor housing, and the lever surfaces are connected to one another by the actuating surface.

11. The arrangement of claim 8 wherein:
the engagement portion includes one or more pins on the mounting frame.

12. The arrangement of claim 8 wherein:
the sensor housing includes a sensor housing body and a sensor housing cover;
wherein the bracket is on the sensor housing cover and is connected to the sensor housing body such that the sensor housing body and the sensor housing cover are mechanically connected to one another via the bracket with the sensor housing cover being sandwiched between the bracket and the sensor housing body.

13. The arrangement of claim 8 wherein:
the bracket includes a knife edge bearing;
wherein the lever is pivotably mounted to the bracket at the pivot point by being pivotably mounted on the knife edge bearing of the bracket.

14. A sensor arrangement comprising:
a mounting frame having an engagement portion;
a sensor housing; and
a two-arm lever having first and second lever arms, wherein the lever is pivotably mounted to the sensor housing at a pivot point between a portion of the first lever arm and a portion of the second lever arm, wherein the portions of the lever arms are aligned with the pivot point and with one another, wherein pivoting of the lever in response to torque acting on the first lever arm causes the sensor housing to move toward the mounting frame, wherein the second lever arm engages the engagement portion of the mounting frame after the lever is further pivoted to a final assembly position to thereby hold the sensor housing in place against the mounting frame.

15. The arrangement of claim 14 wherein:
the first lever arm of the lever includes an actuating surface, wherein the first lever arm never engages the engagement portion of the mounting frame.

16. The arrangement of claim 15 wherein:
the lever includes two lever surfaces mounted parallel to two side surfaces of the sensor housing, and the lever surfaces are connected to one another by the actuating surface.

17. The arrangement of claim 14 further comprising:
a bracket;
wherein the sensor housing includes a sensor housing body and a sensor housing cover;
wherein the bracket is on the sensor housing cover and is connected to the sensor housing body such that the sensor housing body and the sensor housing cover are mechanically connected to one another via the bracket with the sensor housing cover being sandwiched between the bracket and the sensor housing body.

18. The arrangement of claim 17 wherein:
the bracket includes a knife edge bearing;
wherein the lever is pivotably mounted to the sensor housing at the pivot point by being pivotably mounted on the knife edge bearing of the bracket.

* * * * *